United States Patent
Igeta

(10) Patent No.: US 6,623,593 B2
(45) Date of Patent: *Sep. 23, 2003

(54) METHOD OF FORMING AN OUTLET STRUCTURE OF SEALED CONTAINER HAVING A HOLLOW MEMBER WITH A FLARE-SHAPED OPENING PORTION

(75) Inventor: Shunichi Igeta, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/494,517

(22) Filed: Jan. 31, 2000

(65) Prior Publication Data

US 2002/0059977 A1 May 23, 2002

Related U.S. Application Data

(62) Division of application No. 09/207,405, filed on Dec. 8, 1998.

(30) Foreign Application Priority Data

Dec. 10, 1997 (JP) ................................................ 9-339941
Nov. 5, 1998 (JP) ............................................. 10-314526

(51) Int. Cl.$^7$ ................................................. H01J 9/26
(52) U.S. Cl. ........................ 156/293; 156/306.6; 65/34; 65/43

(58) Field of Search ................................. 65/36, 42, 43, 65/152, 155, 34, 59.5; 156/304.2, 293, 69, 306.6, 322

(56) References Cited

U.S. PATENT DOCUMENTS 3,975,176 A * 8/1976 Salisbury ........................ 65/38
5,897,927 A * 4/1999 Tsai et al. ...................... 428/34

FOREIGN PATENT DOCUMENTS

| JP | 62184653 U | | 1/1987 | |
|---|---|---|---|---|
| JP | 2295028 A | | 12/1990 | |
| JP | 6012985 A | | 1/1994 | |
| JP | 06-139961 | * | 5/1994 | ............ H01J/29/86 |
| JP | 7-105848 | * | 4/1995 | ............ H01J/9/38 |
| JP | 8-138553 | | 5/1996 | |
| JP | 09306362 | * | 11/1997 | ............ H01J/9/26 |
| JP | 2000-82410 A | * | 3/2000 | ............ H01J/11/02 |

* cited by examiner

Primary Examiner—Michael W. Ball
Assistant Examiner—Todd J. Kilkenny
(74) Attorney, Agent, or Firm—Birch, Stewart, Kolasch & Birch, LLP

(57) ABSTRACT

A funnel-shaped chip tube and a tubular-shaped press frit are prepared. After the chip tube is disposed on a major surface of a substrate so that the center axis of an exhaust hole provided in the substrate of a sealed container body and the center axis of the chip tube may substantially coincide with each other, the press frit is so disposed as to be located on a surface of an opening portion. After that, by heating the whole device, the press frit is heated and melted, to provide a sealing member contiguously from an outer-rim outside portion of the flare-shaped opening portion of the chip tube to a portion of a tubular portion beyond a boundary.

7 Claims, 11 Drawing Sheets

(a)

METHOD OF FORMING AN OUTLET STRUCTURE OF SEALED CONTAINER HAVING A HOLLOW MEMBER WITH A FLARE-SHAPED OPENING PORTION

This application is a divisional of application Ser. No. 09/207,405, filed on Dec. 8, 1998, the entire contents of which are hereby incorporated by reference.

BACKGROUND OF THE INVENTION

1. Field of the Invention

The present invention relates to an outlet structure of sealed container, and more particularly to an outlet structure of chip tube for exhaust in a sealed container such as a plasma display panel, and a technique for manufacturing the same.

2. Description of the Background Art

FIG. 18 is a cross section showing a principal part of an outlet structure of sealed container in accordance with a first prior art illustrated in FIG. 3 of microfilmed Utility Model Application No. 61-73604. FIG. 18 shows a sealed container body 10A constituted of two glass substrates such as a plasma display panel whose peripheral portions are bonded to retain an airtight condition, a second substrate 1011A made of glass which is a constituent of the sealed container body 10A, such as a rear glass substrate opposed to a display surface side in a case of a plasma display panel, an exhaust hole 1012A, a concave portion 1013A provided in an outer surface side of the second substrate 1011A, a chip tube 20A as a hollow member for exhaust to be connected to a not-shown vacuum pump and the like when the sealed container body 10A is exhausted and a glass paste 30A obtained by mixing powder of low melting point glass (frit glass) as a thermofusible material into a binder and the like. In the following discussion, the low melting point glass refers to a glass material having a melting point lower than that of normal glass, e.g., of about 400° C., more broadly to a glass material which is melted in a temperature lower than the above sealed container body 10A and the chip tube 20A are melted.

A prior-art process for bonding the chip tube 20A for exhaust to the sealed container body 10A goes as follows. As shown in FIG. 18, the chip tube 20A is inserted in the exhaust hole 1012A having the concave portion 1013A provided in the second substrate 1011A of the sealed container body 10A, to be stood. After applying the glass paste 30A by hand-painting and the like, the chip tube 20A is put in a furnace, being stood, together with the sealed container body 10A, to be heated. The glass paste 30A is melted, to thereby bond (seal) the second substrate 1011A and the chip tube 20A.

FIG. 19 is a vertical cross section showing an outlet structure of sealed container in accordance with a second prior art illustrated in FIG. 4 of microfilmed Utility Model Application No. 61-73604. In the structure of FIG. 19, the chip tube 20B consisting of a tubular portion 2021 and a flare portion 2022 covers an exhaust hole 1012B provided in a lower plate 1011B of a sealed container 10B. A process for bonding the chip tube 20B and the lower plate 1011B of the sealed container 10B goes as follows. Specifically, a sealing member 30B in paste form such as frit glass is applied to the periphery of an outer rim of the flare portion 2022, a portion of an outer surface thereof and a portion of an inner surface thereof by hand, and the whole device is thereafter heated to seal the lower plate 1011B and the chip tube 20B.

When the prior-art method, i.e., hand-painting of glass paste, is used, the thickness of applied glass paste is likely to be uneven and it is difficult to apply the glass paste steadily to the same position, it sometimes happens that the glass paste is applied to unnecessary portions. If the glass paste is applied to an unnecessary portion, melted low melting point glass flows in the sealed container body through the exhaust hole to contaminate the inside of the sealed container body. Further, if bubbles are mixed in the applied glass paste, the physical strength is deteriorated and at worst a leak occurs to break the airtight condition.

SUMMARY OF THE INVENTION

The present invention is directed to an outlet structure of sealed container. According to a first aspect of the present invention, the outlet structure of sealed container comprises: a hollow member having a tubular portion and a flare-shaped opening portion contiguous to the tubular portion with its diameter expanded towards one end portion of the hollow member, the one end portion being in contact with a major surface of a sealed container body on the periphery of a hole provided in the sealed container body, the opening portion and the tubular portion covering the hole, the hole and the tubular portion having center axes which substantially coincide with each other; and a sealing member adhered contiguously from the outside of an outer rim of the flare-shaped opening portion at the one end portion of the hollow member in the major surface to a portion of the tubular portion beyond the boundary of the flare-shaped opening portion and the tubular portion over the major surface between the outer rim and the outside of the outer rim and a surface of the opening portion.

According to a second aspect of the present invention, in the outlet structure of sealed container of the first aspect, low melting point glass is used as a base material of the sealing member.

According to a third aspect of the present invention, in the outlet structure of sealed container of the second aspect, the sealing member is formed by melting the low melting point glass after disposing the low melting point glass on the periphery of the hollow member.

According to a fourth aspect of the present invention, in the outlet structure of sealed container of the third aspect, the low melting point glass is formed in a tubular shape.

According to a fifth aspect of the present invention, in the outlet structure of sealed container of the fourth aspect, the inside of one end portion of the low melting point glass is out of contact with the flare-shaped opening portion and abuts the major surface of the sealed container body.

According to a sixth aspect of the present invention, in the outlet structure of sealed container of the fourth aspect, the inside of one end portion of the low melting point glass has a concave portion with a diameter substantially equal to a diameter of the outer rim of the flare-shaped opening portion.

According to a seventh aspect of the present invention, in the outlet structure of sealed container of the fourth aspect, the low melting point glass has an outer diameter which is one point two to one point four times as large as a diameter of the outer rim of the flare-shaped opening portion.

According to an eighth aspect of the present invention, in the outlet structure of sealed container of the first aspect, the sealed container body is provided with a holding portion which holds at least a portion of the outer rim of the flare opening portion.

According to a ninth aspect of the present invention, in the outlet structure of sealed container of the first aspect, the sealed container body corresponds to a plasma display panel body.

According to a tenth aspect of the present invention, in the outlet structure of sealed container of the first aspect, the sealed container body corresponds to a display unit body for displaying an image.

According to an eleventh aspect of the present invention, the outlet structure of sealed container comprises: (a) a hollow member having a tubular portion and a flare-shaped opening portion contiguous to the tubular portion with its diameter expanded towards one end portion of the hollow member, the one end portion being located above a major surface of a sealed container body on the periphery of a hole provided in the sealed container body, the opening portion and the tubular portion covering the hole, the hole and the tubular portion having center axes which substantially coincide with each other; and (b) a sealing member adhered on the one end portion of the hollow member to fill between the one end portion and the major surface.

According to a twelfth aspect of the present invention, in the outlet structure of sealed container of the eleventh aspect, low melting point glass is used as a base material of the sealing member.

According to a thirteenth aspect of the present invention, in the outlet structure of sealed container of the twelfth aspect, the sealing member is formed by disposing a press frit which is press molded in a tubular form in advance on the major surface on the periphery of the hole, melting the press frit after disposing the one end portion of the hollow member thereon and thereafter cooling melted press frit.

According to a fourteenth aspect of the present invention, in the outlet structure of sealed container of the eleventh aspect, the sealed container body corresponds to a plasma display panel body.

According to a fifteenth aspect of the present invention, in the outlet structure of sealed container of the eleventh aspect, the sealed container body corresponds to a display unit body for displaying an image.

The present invention is also directed to a method of forming an outlet structure of sealed container. According to a sixteenth aspect of the present invention, the method comprises the steps of: (a) preparing a sealed container body comprising a hole for exhaust formed inwardly from a major surface of said sealed container body; (b) preparing a hollow member having a tubular portion and a flare-shaped opening portion contiguous to the tubular portion with its diameter expanded towards one end portion of the hollow member; (c) preparing a thermofusible material which is produced in a tubular form, having an outer diameter larger than an outer diameter of the one end portion of the hollow member, an innermost diameter smaller than the outer diameter of the one end portion and larger than a diameter of the hole and a melting point lower than those of the hollow member and the sealed container body; (d) disposing the thermofusible material on the major surface on the periphery of the hole and disposing the one end portion on a surface of the thermofusible material so that center axes of the hollow member and the hole substantially coincide with each other; and (e) bonding the sealed container body and the one end portion of the hollow member to each other by heating and melting the thermofusible material.

According to a seventeenth aspect of the present invention, in the method of the sixteenth aspect, the step (d) comprises the steps of (d-i) preparing a jig comprising ① a stick member comprising a first portion with its maximum diameter being substantially equal to an inner diameter of the tubular portion and a second portion contiguous to one end of the first portion to serve as a tip portion with its maximum diameter being substantially equal to a diameter of the hole, ② a column having a top portion connected to the other end of the first portion of the stick member and a side plate portion with its upper portion connected to the top portion, the column supporting the stick member extending downwardly with the top portion, and ③ a base portion having an upper surface portion connected to a lower portion of the side plate portion of the column and a lower surface portion which can come into contact with the major surface outside a position where the thermofusible material is disposed, the jig made of a material having a melting point higher than the thermofusible material, a length of the stick member being larger than a height from the top portion to the lower surface portion of the base portion; (d-ii) disposing the thermofusible material on the major surface on the periphery of the hole and thereafter disposing the one end portion of the hollow member on the surface of the thermofusible material; and (d-iii) inserting the stick member into a hollow portion of the hollow member to fit the first portion into the hollow portion and further inserting the second portion into the hole to provide the lower surface portion of the base portion on the major surface in contact with each other, and the step (e) comprising the step of (e-i) heating the thermofusible material together with the jig.

According to an eighteenth aspect of the present invention, in the method of the seventeenth aspect, the step (d-i) comprises the step of (d-i-1) preparing a cover having an inner diameter which is substantially equal to the maximum outer diameter of the first portion and an outer diameter larger than an outer diameter of the tubular portion, the step (d-ii) comprises the step of (d-ii-1) putting the cover on the other end portion of the hollow member disposed on the surface of the thermofusible material, and the step (d-iii) comprises the step of (d-iii-1) inserting the stick member into the hollow portion of the hollow member through a center hole of the cover.

The present invention further has the following aspects. According to an aspect of the present invention, a method of forming an outlet structure of sealed container comprises the steps of: (a) preparing a hollow member including a tubular portion and a flare-shaped opening portion contiguous to the tubular portion with its diameter expanded towards one end portion of the hollow member; (b) preparing a jig comprising ① a stick member including a first portion with its maximum diameter being substantially equal to an inner diameter of the tubular portion of the hollow member disposed on a sealed container body and a second portion contiguous to the first portion to form a tip portion with its maximum diameter being substantially equal to a diameter of a hole provided in the sealed container body, ② a column for supporting the stick member with its one end portion connected to the stick member, and ③ a base portion having an upper surface portion connected to the other end portion of the column and a lower surface portion disposed on the sealed container body; (c) preparing a thermofusible material which is produced in such a tubular shape as to be accommodated in a space surrounded by the base portion, having an outer diameter larger than an outer diameter of the one end portion of the hollow member, an innermost diameter larger than an outer diameter of the tubular portion and smaller than the outer diameter of the one end portion and a melting point lower those of the hollow member, the jig and the sealed container body; (d) inserting the second portion of the stick member into the hole through the tubular portion and the flare-shaped opening portion after disposing the thermofusible material on the periphery of the hollow member to fit the first portion into the tubular portion and make the center axes of the hole and the hollow member coincident; and (e) bonding the sealed container body and the hollow member to each other by heating the thermofusible material together with the jig to melt the thermofusible material.

According to another aspect of the present invention, a plasma display panel comprises: a plasma display panel body; a hollow member including a tubular portion and a flare-shaped opening portion contiguous to the tubular portion with its diameter expanded towards one end portion of the hollow member, the one end portion being in contact with a major surface of the plasma display panel body on the periphery of a hole provided in the plasma display panel body, the opening portion and the tubular portion covering the hole, the hole and the tubular portion having center axes which substantially coincide with each other; and a sealing member adhered contiguously from the outside of an outer rim of the flare-shaped opening portion at the one end portion of the hollow member in the major surface to a portion of the tubular portion beyond the boundary of the flare-shaped opening portion and the tubular portion over the major surface between the outer rim and the outside of the outer rim and a surface of the opening portion.

According to a further aspect of the present invention, a method of manufacturing a plasma display panel comprises the steps of: (a) preparing a hollow member including a tubular portion and a flare-shaped opening portion contiguous to the tubular portion with its diameter expanded towards one end portion of the hollow member; (b) preparing a jig comprising ① a stick member including a first portion with its maximum diameter being substantially equal to an inner diameter of the tubular portion of the hollow member disposed on a plasma display panel body and a second portion contiguous to the first portion to form a tip portion with its maximum diameter being substantially equal to a diameter of a hole provided in the plasma display panel body, ② a column for supporting the stick member with its one end portion connected to the stick member, and ③ a base portion having an upper surface portion connected to the other end portion of the column and a lower surface portion disposed on the plasma display panel body; (c) preparing a thermofusible material which is produced in such a tubular shape as to be accommodated in a space surrounded by the base portion, having an outer diameter larger than an outer diameter of the one end portion of the hollow member, an innermost diameter larger than an outer diameter of the tubular portion and smaller than the outer diameter of the one end portion and a melting point lower those of the hollow member, the jig and the plasma display panel body; (d) inserting the second portion of the stick member into the hole through the tubular portion and the flare-shaped opening portion after disposing the thermofusible material on the periphery of the hollow member to fit the first portion into the tubular portion and make the center axes of the hole and the hollow member coincident; and (e) bonding the plasma display panel body and the hollow member to each other by heating the thermofusible material together with the jig to melt the thermofusible material.

According to an yet aspect of the present invention, a display device comprises: a display portion body provided therein with an electrode for display; a hollow member having a tubular portion and a flare-shaped opening portion contiguous to the tubular portion with its diameter expanded towards one end portion of the hollow member, the one end portion being in contact with a major surface of the display portion body on the periphery of a hole provided in the display portion body, the opening portion and the tubular portion covering the hole, the hole and the tubular portion having center axes which substantially coincide with each other; and a sealing member adhered contiguously from the outside of an outer rim of the flare-shaped opening portion at the one end portion of the hollow member in the major surface to a portion of the tubular portion beyond the boundary of the flare-shaped opening portion and the tubular portion over the major surface between the outer rim and the outside of the outer rim and a surface of the opening portion.

Thus, the present invention produces the following effects.

In accordance with the outlet structure of sealed container of the first aspect, the airtight condition is kept and the bending strength is improved, to achieve an excellent outlet structure of sealed container.

In the outlet structure of sealed container of the second and twelfth aspects, the sealed container and the hollow member can be bonded while preventing deformation of the sealed container.

In the outlet structure of sealed container of the third aspect, it is possible to prevent the melted low melting point glass from flowing in the sealed container body.

In the outlet structure of sealed container of the fourth aspect, the sealed container and the hollow member can be reliably bonded and the low melting point glass can be easily adhered on the hollow member.

In the outlet structure of sealed container of the fifth aspect, the airtight condition is more reliably achieved.

In the outlet structure of sealed container of the sixth aspect, the low melting point glass can be disposed with high accuracy and the airtight condition is more reliably achieved.

In the outlet structure of sealed container of the seventh aspect, the bonding is made with more reliable airtight condition and higher bending strength.

In the outlet structure of sealed container of the eighth aspect, the airtight condition can be kept more reliably and the bending strength can be improved.

In accordance with the eleventh to eighteenth aspects of the present invention, ① the one end portion of the hollow member can be reliably bonded on the major surface with the sealing member without applying the glass paste by hand, and ② it is possible to prevent the stress from concentrating on the tubular portion of the hollow member and inhibit occurrence of cracking on the tubular portion in an exhausting process.

Especially, in accordance with the seventeenth aspect of the present invention, since a predetermined jig is used, the center axes of the hollow member and the hole can substantially coincide with each other with stability, reliability and ease and the positions of the thermofusible material and hollow member can be determined with stability and high accuracy, and moreover it is possible to stably keep substantial coincidence between the center axes of the hollow member and hole even in a state where the thermofusible material is melted.

Further, in accordance with the eighteenth aspect of the present invention, since the cover is used, it is possible to inhibit inhalation of unnecessary impurity gases into the sealed container body in the sealing process, especially during cooling.

In the method of forming the outlet structure of sealed container of the present invention, since the jig having the stick member which is inserted in the hole provided in the sealed container body and the hollow member to make the respective center axes substantially coincident is used and the thermofusible material which is formed in a tubular form on the periphery of the hollow member is heated and melted to bond the sealed container body and the hollow member, it is possible to make the center axes of the hole and the hollow member substantially coincident easily and stably. Moreover, it is possible to prevent the hollow member from falling down and stabilize the position of the hollow member.

In accordance with the plasma display panel of the present invention, an excellent plasma display panel is achieved with the airtight condition kept and the bending strength improved.

In accordance with the method of manufacturing the plasma display panel of the present invention, the method of manufacturing the plasma display panel is achieved, by which the respective center axes of the hole provided in the sealed container body and the hollow member can substantially coincide with each other easily and stably and it becomes possible to prevent the hollow member from falling down and stabilize the position of the hollow member.

In accordance with the display device of the present invention, a display device having a display portion with excellent display condition without contamination due to the melted sealing member inside the display portion. Further, a display device is achieved, which has high bending strength at the adhered member and causes no damage in the outlet structure of the display unit even if, for example, some external force is applied due to vibration in conveyance and the like.

An object of the present invention is to provide an outlet structure of sealed container which allows a sealed container body and a hollow member to be stably sealed.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
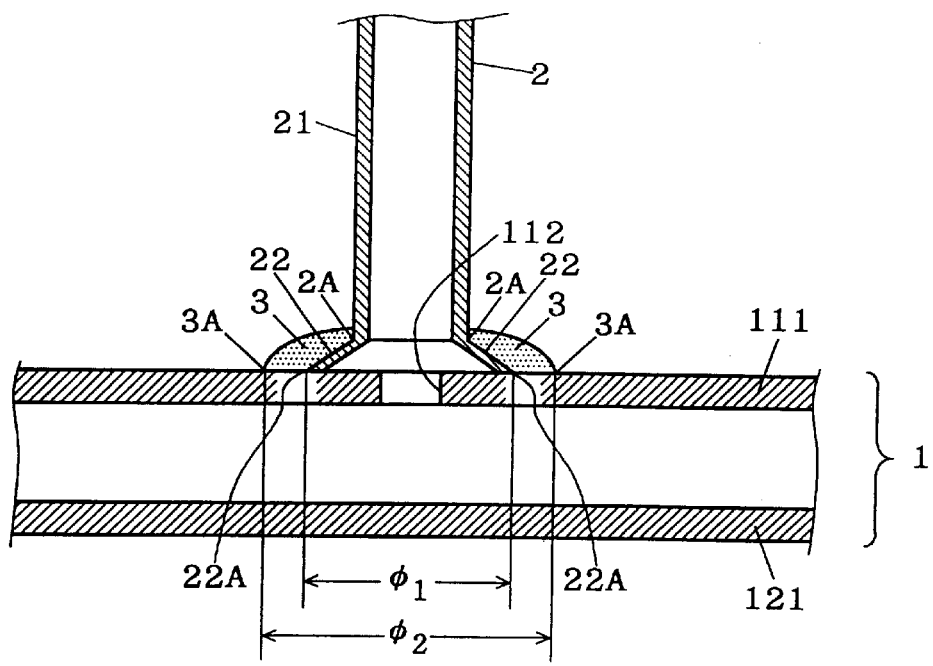
FIG. 1 is a cross section showing a principal part of an outlet structure of sealed container in accordance with a first preferred embodiment.

FIG. 1 is a cross section showing a principal part of an outlet structure of sealed container in accordance with the first preferred embodiment of the present invention. FIG. 1 shows a sealed container body 1 such as a plasma display panel, including a second substrate 111 and a first substrate 121. The second substrate 111 and the first substrate 121, whose outer peripheral portions are sealed with low melting point glass and the like, retain an airtight condition. A chip tube 2 as a hollow member has a tubular portion 21 and a flare-shaped opening portion 22 contiguous to the tubular portion with its diameter expand towards one end portion of the chip tube 2. Further, this figure shows a sealing material 3 as a sealing member made of low melting point glass as a thermofusible material, for bonding the sealed container body 1 and the chip tube 2, and an exhaust hole 112 provided in the second substrate 111. In the plasma display panel (hereinafter, referred to as a PDP) included in a display device discussed herein, the second substrate 111 and the first substrate 121 serve as a rear substrate (back panel) and a front substrate (front panel), respectively, and the chip tube 2 and the second and first substrates 111 and 121 are each made of glass.

In the following discussion, the low melting point glass refers to a glass material having a melting point lower than that of normal glass, e.g., of about 400° C., more broadly to a glass material which is melted in a temperature lower than the above sealed container body 1 and the chip tube 2 are melted.

In a case of a PDP, members for displaying an image on the PDP such as electrodes and barriers are provided on respective inner surface sides of the opposed second and first substrates 111 and 121 of the sealed container body 1, and the inside is filled with a discharge gas (mixed gas including Ne, Xe and the like).

The chip tube 2 is provided on a major surface of the second substrate 111 (a surface opposed to the inner surface) and covers the exhaust hole 112 to form a path for gas connected to the exhaust hole 112. Through the chip tube 2, the sealed container body 1 is exhausted and filled with gas, and then a predetermined portion of the tubular portion 21 of the tube 2 is closed to cut the atmosphere inside the sealed container body 1 off from the external atmosphere.

In the outlet structure of sealed container body 1 of this preferred embodiment, the sealing member 3 is adhered contiguously from a region 3A which is located outside an outer rim where the sealed container body 1 and the chip tube 2 come into contact with each other, i.e., an outer rim 22A (whose diameter is represented as φ 1 in FIG. 1) of the flare-shaped opening portion 22 in the chip tube 2 and is larger than an outer rim of the flare-shaped opening portion 22 (hereinafter, referred to as an outer-rim outside portion 3A whose diameter is represented as φ 2 in FIG. 2) to a portion of the tubular portion 21 beyond a boundary 2A between the flare-shaped opening portion 22 and the tubular portion 21 of the chip tube 2. This enhances the bending strength (resistance when a force is applied to the other end of the chip tube 2 in parallel to a surface direction of the second substrate 111) while retaining the airtight condition, and therefore a good outlet structure can be provided.

In this case, since the chip tube 2 is provided with the tubular portion 21 and the flare-shaped opening portion 22 contiguous to the tubular portion 21 with its diameter expanded towards its one end portion and the chip tube 2 is provided on the sealed container body 1 being in contact with each other while ensuring a relatively-positional relation between the sealed container body 1 and the chip tube 2, such that the center axis of the exhaust hole 112 provided in the sealed container body 1 and the center axis of the chip tube 2 (basically, being substantially coincident with the center axis of the tubular portion 21) may substantially coincide with each other, the outer rim 22A of the flare-shaped opening portion 22 uniformly comes into contact with the second substrate 111 of the sealed container body 1 and the chip tube 2 can be disposed so that its direction of the center axis may be always perpendicular to the second substrate 111, and therefore the chip tube 2 can be disposed always stably.

Since the center axis of the exhaust hole 112 provided in the sealed container body 1 coincides with the center axis of the chip tube 2, it becomes possible to obtain a uniform efflux vector of exhaust gas (e.g., air) from the sealed container body 1 inside the exhaust hole 112 and the chip tube 2. This, for example, reduces an ill effect of obstacle on the exhaust path for gas inside the chip tube 2 (e.g., exhaust resistance such as turbulence inside the chip tube 2), leading to a good exhaust condition depending on eduction.

As discussed above, ensuring the positional relation between the exhaust hole 112 of the sealed container body 1 and the chip tube 2, the sealing member 3 is formed by melting the low melting point glass disposed on the periphery of the chip tube 2, to achieve a uniform bonding condition of the second substrate 111 of the sealed container body 1 and the chip tube 2 over the whole outer rim 22A of the flare-shaped opening portion 22. Even if some external force is exerted on the chip tube 2, an internal stress is uniformly dispersed over the whole bonding portion. Therefore, an excellent bonding condition is ensured to prevent the chip tube 2 from breaking or removing off from the sealed container body 1. Since the outer rim 22A of the flare-shaped opening 22 has a diameter larger than that of the exhaust hole 112 provided in the sealed container body 1, it is possible to prevent the heated and melted low melting point glass from flowing in the sealed container body 1 through the exhaust hole 112.

A method of achieving the adherence condition of the sealing member 3 as described above will be discussed with reference to FIG. 2.

Figure 2:
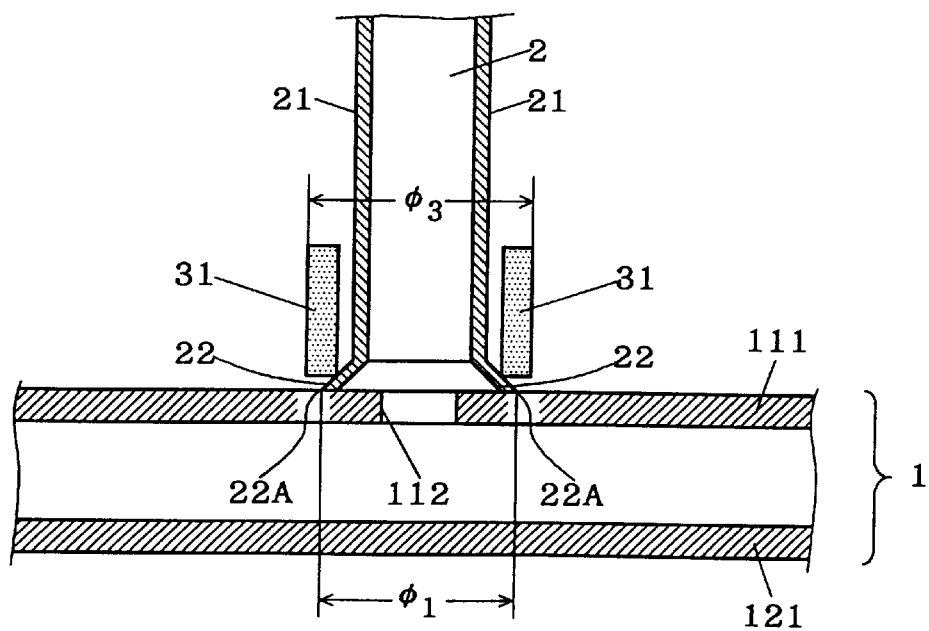
FIG. 2 is a cross section showing a state where a press frit in accordance with the first preferred embodiment is disposed on the periphery of a chip tube.

FIG. 2 is a vertical cross section showing a state where low melting point glass (a press frit discussed below) is disposed on the periphery of the chip tube 2. In FIG. 2, low melting point glass 31 is formed by press molding in a tubular form (hereinafter, referred to as a press frit), and the press frit 31 has an outer diameter (represented as $\phi 3$ in FIG. 2) larger than the diameter $\phi 1$ of the outer rim 22A of the flare-shaped opening portion 22. The inner diameter of the press frit 31 is smaller than the diameter $\phi 1$ of the outer rim 22A and larger than the outer diameter of the tubular portion 21.

As shown in FIG. 2, being disposed on the periphery of the chip tube 2, the above-discussed press frit 31 is melted by heating. In this case, the press frit 31 is so disposed as to be uniformly distributed over the whole outer rim 22A when viewed from the center axis of the chip tube 2 so that the melted low melting point glass may be uniformly distributed over the outer rim 22A of the flare-shaped opening portion 22. This allows a good bonding condition of the second substrate 111 and the chip tube 2 with the sealing member 3 uniformly distributed over the whole outer rim 22A of the flare-shaped opening portion 22.

Figure 3:
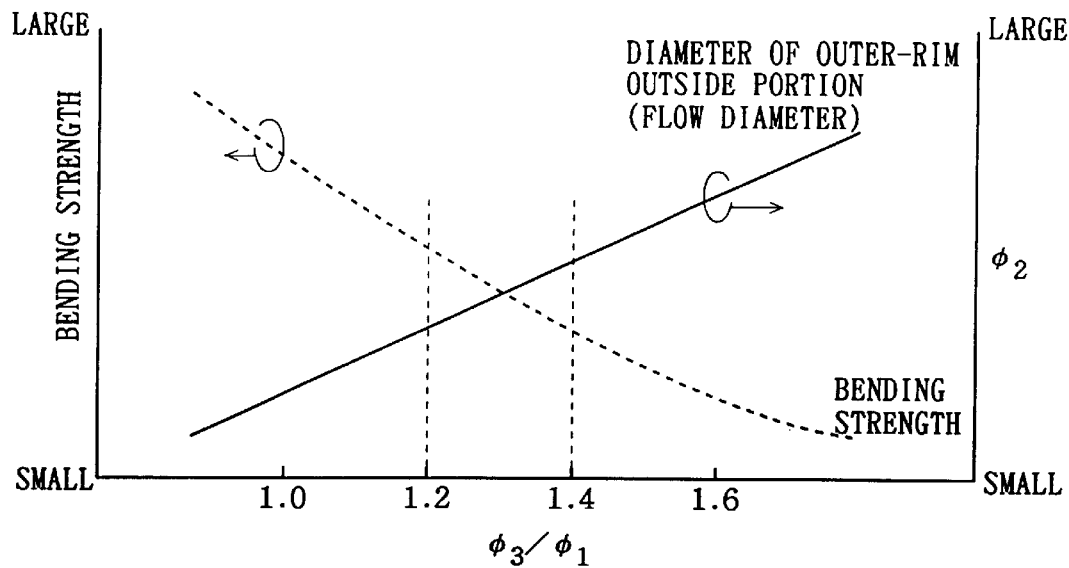
FIG. 3 shows a relation between ratio of diameters φ 3/φ 1 and bending strength in the first preferred embodiment.
Figure 4:
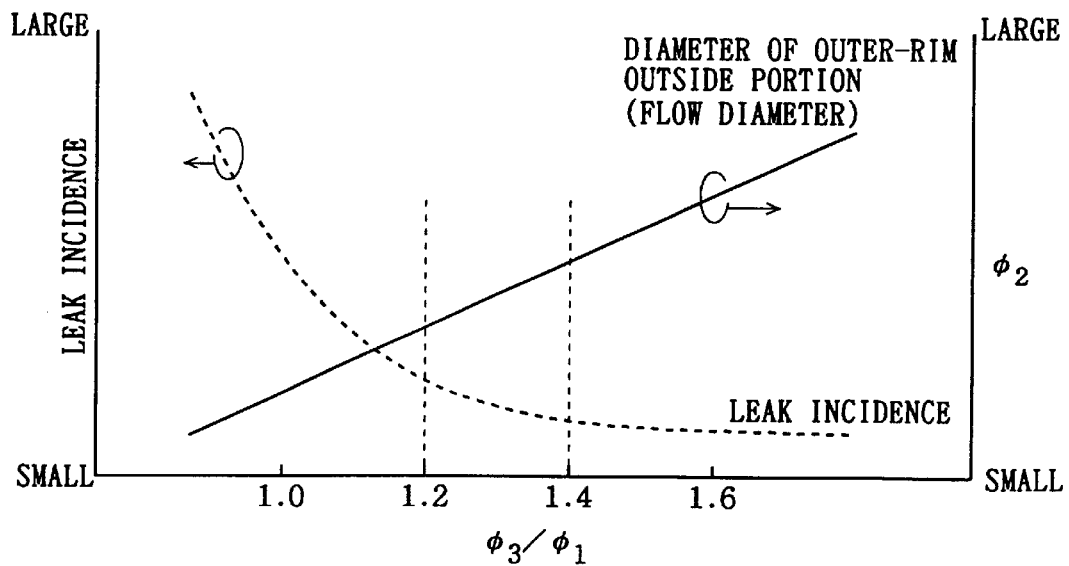
FIG. 4 shows a relation between ratio of diameters φ 3/φ 1 and leak incidence in the first preferred embodiment.

Further, a study has been made on a relation between the diameter $\phi 3$ of the press frit 31 and the diameter $\phi 1$ of the outer rim 22A. FIGS. 3 and 4 show the diameter $\phi 2$ of the outer-rim outside portion (coincident with the diameter (flow diameter) of the sealing member 3) and bending strength and leak incidence, respectively, on vertical axis with the ratio $\phi 3/\phi 1$ between the diameter $\phi 3$ of the press frit 31 and the diameter $\phi 1$ of the outer rim 22A on horizontal axis.

As can be seen from FIG. 3, as the diameter ratio $\phi 3/\phi 1$ becomes larger, while the diameter $\phi 2$ becomes larger, the inner diameter of the melted low melting point glass increases and hence the ratio of the sealing member 3 put on the flare-shaped opening portion 22 decreases, and as a result the bending strength decrease.

As can be seen from FIG. 4, as the diameter ratio $\phi 3/\phi 1$ becomes smaller, the leak incidence increases since there is strong possibility that the diameter $\phi 2$ becomes smaller than the diameter $\phi 1$.

Figure 5:
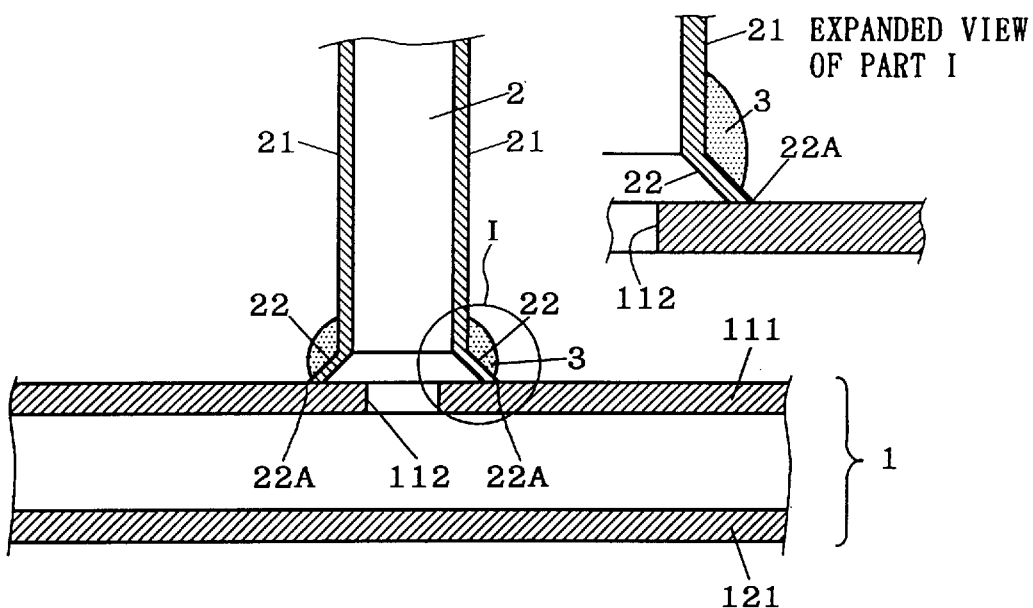
FIGS. 5 and 6 are cross sections each showing a heating condition and an adherence condition of a sealing member in the first preferred embodiment.
Figure 6:
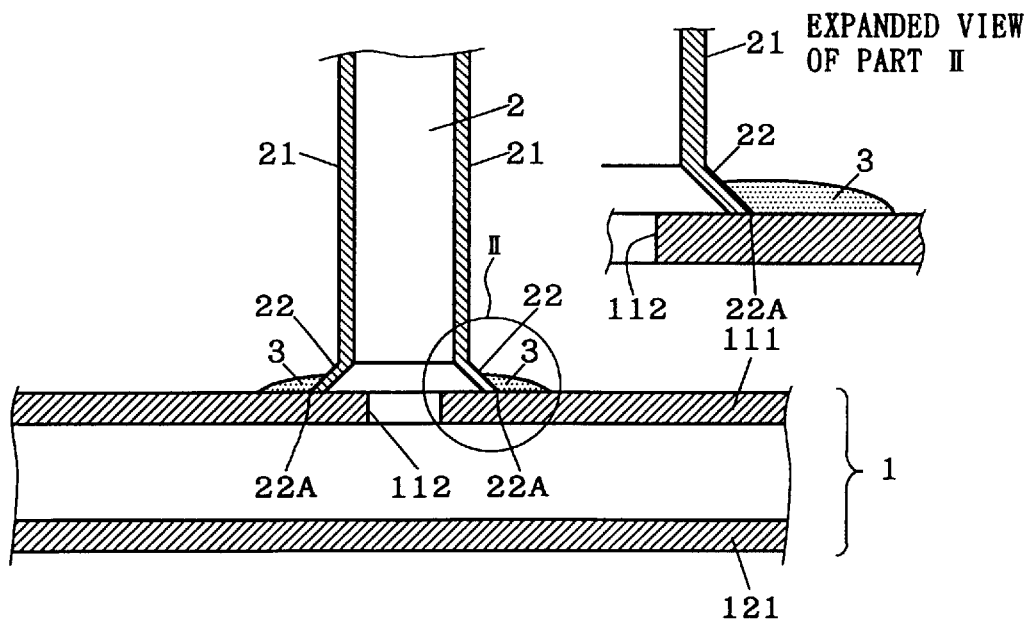

The above conditions are also caused depending on the heating condition. FIGS. 5 and 6 are cross sections each showing an adherence condition of the sealing member 3 depending on the heating condition, and FIG. 5 shows a case of insufficient heating and FIG. 6 shows a case of excessive heating.

Referring to FIG. 5, the case of insufficient heating will be discussed. When the press frit 31 is insufficiently heated (for example, in a case of short heating time though the temperature slightly exceeds the melting point), the press frit 31 is melted, but the low melting point glass stops to move before the flow of the low melting point glass reaches the second substrate 111 beyond the outer rim 22A. In this case, the sealed container body 1 and the chip tube 2 are not bonded.

Referring to FIG. 6, the case of excessive heating will be discussed. When the press frit 31 is excessively heated (for example, in a case of temperature too much higher than the melting point), the viscosity of the press frit 31 when melted becomes rather low and the ratio of the sealing member 3 extending over the flare-shaped opening portion 22 decreases to consequently deteriorate the bending strength, though the melted low melting point glass extends to the second substrate 111 to allow such a bonding as to ensure the airtight condition.

Though it is needless to say that the heating condition should be determined to be optimum, it is found, as the result of the study from FIGS. 3 and 4, that the optimum value of diameter ratio $\phi 3/\phi 1$ ranges from 1.2 to 1.4 to reduce the leak incidence while keeping the bending strength when a bonding is made using the press frit 31 with the heating condition determined optimum. With the diameter ratio $\phi 3/\phi 1$ determined in the above range, it is possible to reduce the leak incidence while keeping the bending strength.

Though the press frit 31 obtained by press-molding of the low melting point glass is used as the thermofusible material in the above example, the thermofusible material is not necessarily limited to a press-worked one but a solid one obtained by solidifying powder of low melting point glass with e.g., paraffin in a tubular form may be used to produce the same effect.

The Second Preferred Embodiment

Though the first preferred embodiment shows a case where one end of the press frit 31 is out of contact with the second substrate 111, the press frit 31 may be disposed in advance on a portion outside the outer rim 22A of the flare-shaped opening portion 22. This case will be discussed below.

Figure 7:
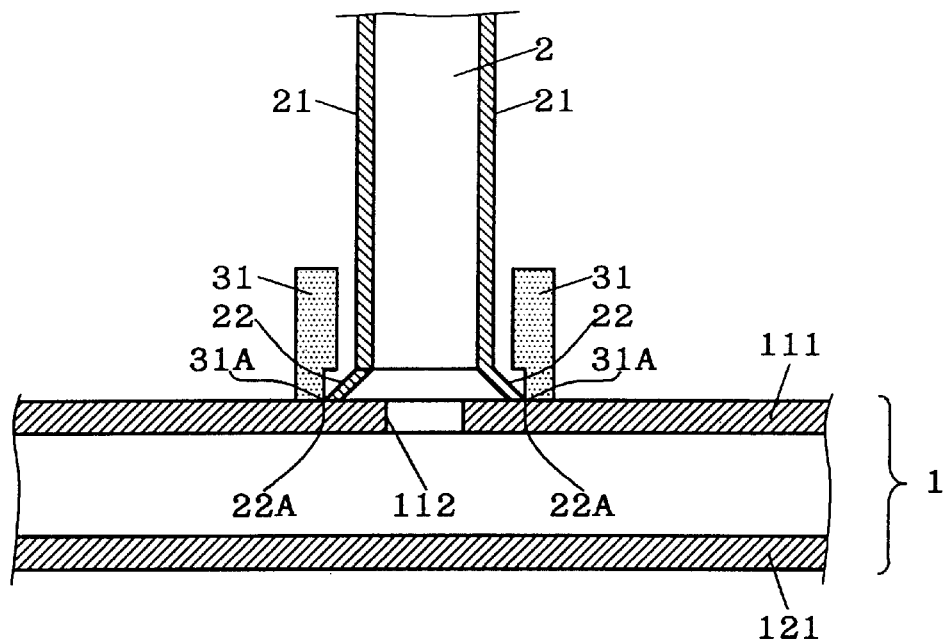
FIGS. 7 and 8 are cross sections each showing a shape of a press frit in accordance with a second preferred embodiment.
Figure 8:
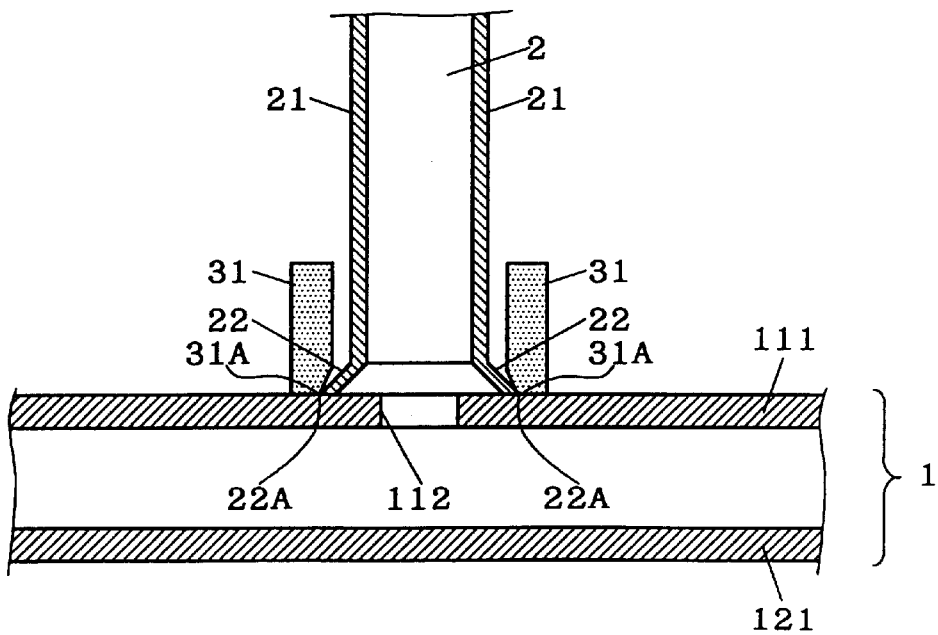

FIGS. 7 and 8 are vertical cross sections each showing a shape of a press frit in accordance with the second preferred embodiment. The press frit 31 is so disposed on the periphery of the chip tube 2 as not to come into contact with an outer surface of the flare-shaped opening portion 22 and as to abut the second substrate 111 of the sealed container body 1. FIGS. 7 and 8 show cases where the press frit 31 is out of contact with the flare-shaped opening portion 22. FIG. 7 shows a case where a stepped concave portion is provided on an inner side of the one end portion of the press frit 31 and FIG. 8 shows a case where a tapered surface is provided on the inner side of the one end portion of the press frit 31.

With these structures, the press frit 31 can be so disposed on the periphery of the chip tube 2 as to abut the second substrate 111 of the sealed container body 1 out of contact with the flare-shaped opening portion 22, and therefore it is possible to bond the chip tube 2 and the sealed container body 1 with the sealing member 3 while reliably ensuring the airtight condition. Further, with variation in the number of steps of the stepped concave portion or the degree of inclination of the tapered surface, changing the melting condition of the low melting point glass and the amount of glass to be melted makes it possible to change the bonding condition.

Furthermore, as shown in FIGS. 7 and 8, when an inner end 31A of the one end portion of the tubular-shaped low melting point glass and the outer rim 22A substantially coincide, in other words, the press frit 31 has a concave portion with a diameter substantially equal to that of the outer rim 22A of the flare-shaped opening portion 22, the press frit 31 can be disposed with higher accuracy for the chip tube 2, to ensure more reliably bonding.

The Third Preferred Embodiment

Figure 9:
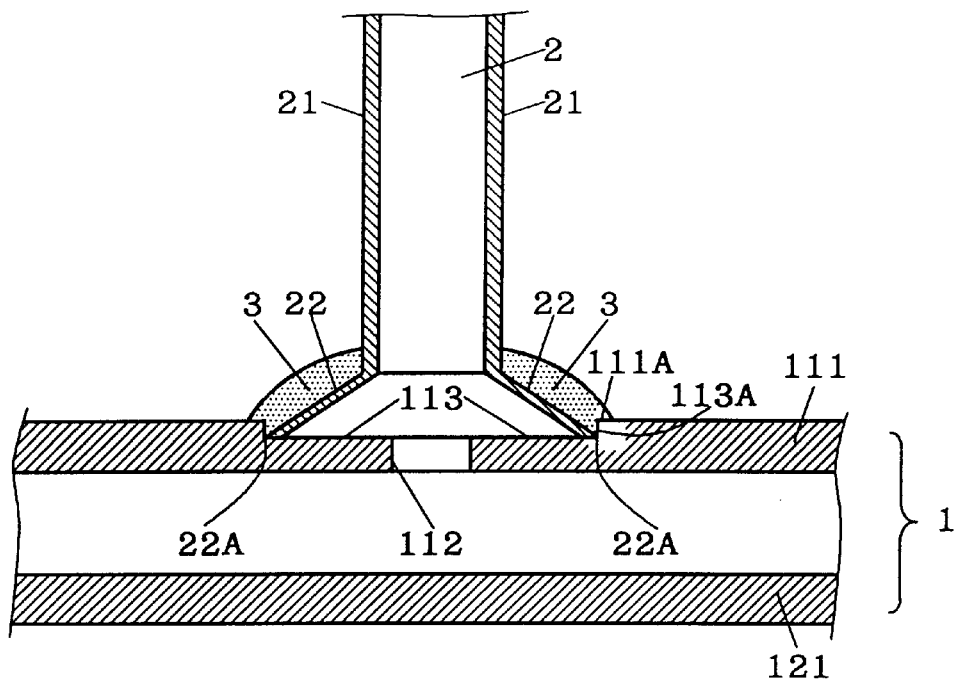
FIGS. 9 to 11 are cross sections each showing a holding unit for a chip tube in accordance with a third preferred embodiment.
Figure 10:
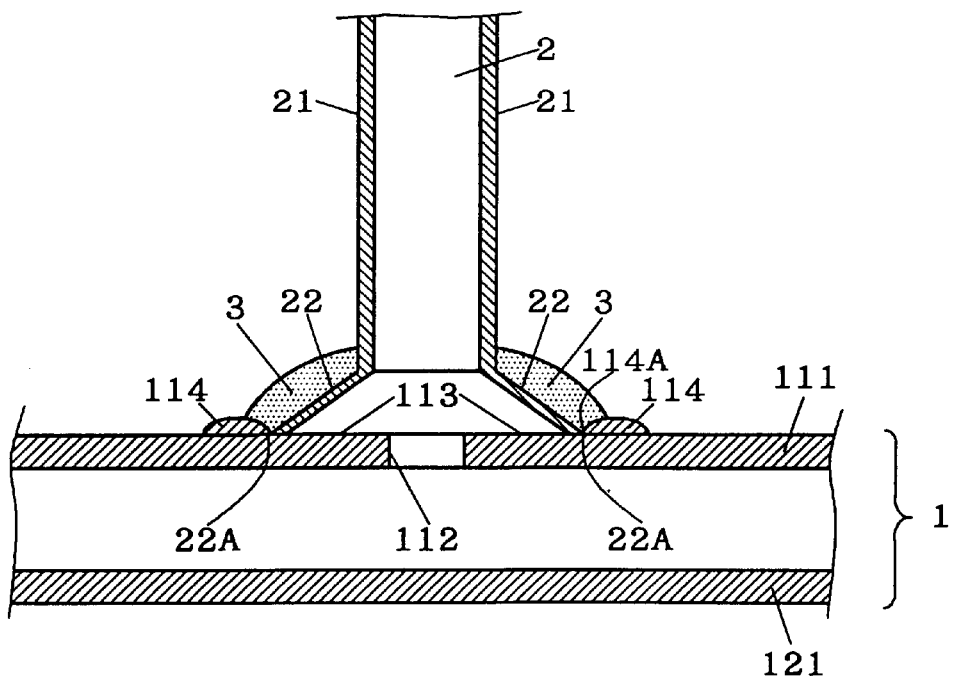

FIGS. 9 and 10 are cross sections showing that a substrate which is a constituent of the sealed container body of the third preferred embodiment has a holding unit for the chip tube. In FIG. 9, a concave portion 113 is provided on the periphery of the exhaust hole 112 as a holding unit. In FIG. 10, a convex portion (convex land) 114 blocking further flow of the melted low melting point glass as well as serving as the holding unit like the concave portion 113 is made of glass like the second substrate 111 and the chip tube 2 to ensure the airtight condition, which has a melting point higher than the low melting point glass which is the material for the sealing member 3.

In the structure shown in FIG. 9, since the concave portion 113 is provided inwardly from the major surface of the second substrate 111 to fit the outer rim 22A into the concave portion 113, positioning of the chip tube 2 can be made easier and the melted low melting point glass also flows in the direction of depth of the concave portion 113 to provide the flow with resistance, controlling excessive flow of the melted low melting point glass. Therefore, the sealing member 3 is reliably left on the flare-shaped opening portion 22 to maintain the bending strength sufficiently high.

Further, since the sealing member 3 is formed with the low melting point glass adhered on both a side wall surface 113A in the direction of depth of the concave portion 113 and an outer surface 111A of the second substrate 111 outside the concave portion 113 as shown in FIG. 9, the second substrate 111 and the chip tube 2 can be bonded more firmly and the airtight condition can be improved.

In the structure shown in FIG. 10, since the convex portion 114 is provided on the major surface of the second substrate 111 to fit the outer rim 22A into a space surrounded by an inner side edge of the convex portion 114, positioning of the chip tube 2 can be made easier and the melted low melting point glass is also adhered in the direction of height of the convex portion 114 to provide the flow with resistance, controlling excessive flow of the melted low melting point glass. Therefore, the sealing member 3 is reliably left on the flare-shaped opening portion 22 to maintain the bending strength sufficiently high. Furthermore, the convex portion 114 can be formed by applying or stamping a glass paste having a melting point higher than e.g., that of the low melting point glass on the second substrate 111 and then burning it.

Further, since the sealing member 3 is formed with the low melting point glass adhered on a side wall surface 114A in the direction of height of the convex portion 114 as shown in FIG. 10, the second substrate 111 and the chip tube 2 can be bonded more firmly and the airtight condition can be improved. Furthermore, with the convex portion 114, it is not necessary to provide the concave portion 113 in the second substrate 111 in advance and even if the size of the outer rim 22A changes, it is possible to easily respond the change.

Figure 11:
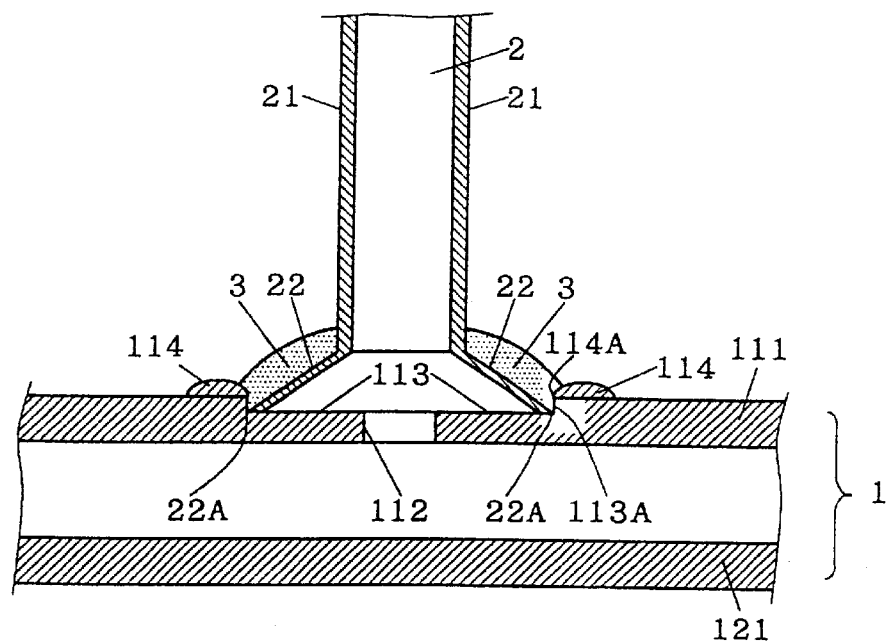

Alternately, as shown in FIG. 11, there may be a structure where both the concave portion 113 of FIG. 9 and the convex portion 114 of FIG. 10 surrounding the concave portion 113 are provided in the second substrate 111, and this structure produces a synergistic effect of both structures.

The convex portion 114 may be contiguous along the outer rim 22A or may be non-contiguous in a broken-line form (in the case of broken-line form, at least three convex portions should be formed). Alternately, for example, a closed curve piece of glass such as a ring-shaped one or plural pieces of glass having a certain height, instead of the ring-shaped one, (in this case, at least three pieces of glass should be formed) may be bonded in advance on the second substrate 111 with the glass having a melting point higher than that of the low melting point glass.

The Fourth Preferred Embodiment

Figure 12:
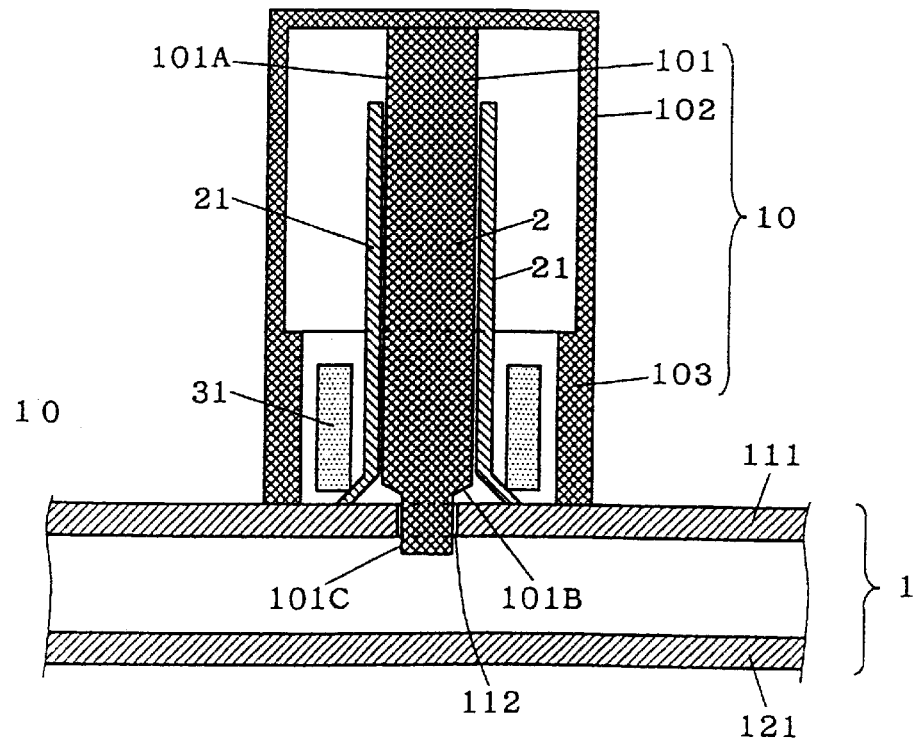
FIG. 12 is a cross section showing a jig for providing a chip tube in accordance with a fourth preferred embodiment.
Figure 13A:
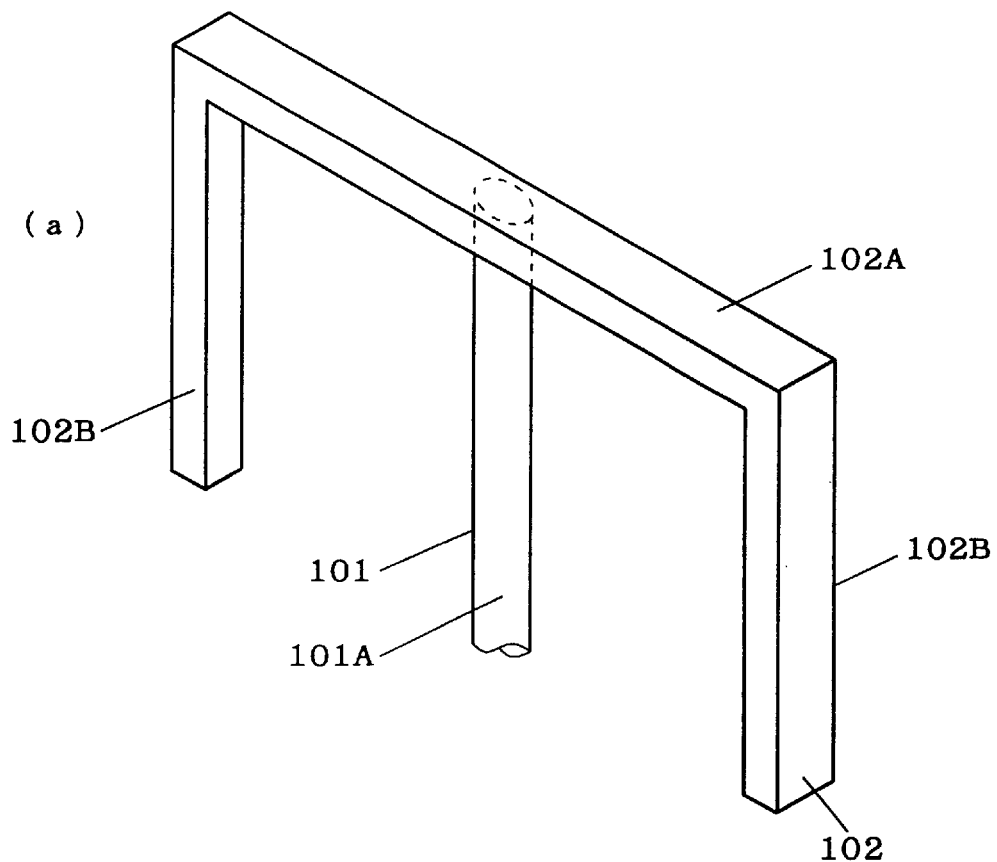
FIG. 13A is a perspective view showing a column of the jig and FIG. 13B is a plan view showing a relation between the column and a base portion of the jig.
Figure 13B:
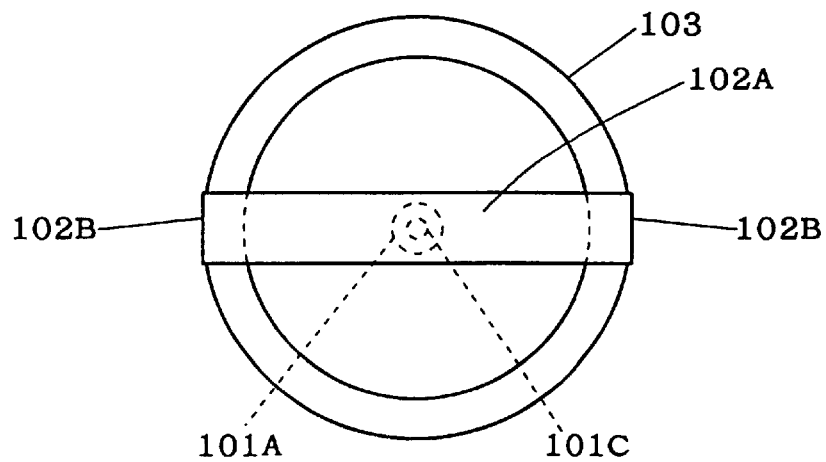

The fourth preferred embodiment is characterized in that a jig having a predetermined structure is used in disposing the chip tube 2 in order to make the center axes of the chip tube 2 and the exhaust hole 112 substantially coincident with each other. FIG. 12 shows a structure of such a dedicated jig 10. In FIG. 12, a stick member 101 serves to make the center axes of the chip tube 2 and the exhaust hole 112 substantially coincident with each other and prevent the chip tube 2 from falling down in heating and melting the press frit 31. The stick member 101 consists of ① a first portion 101A of columnar shape having an outer diameter (e.g., diameter of φ 4.3 mm) substantially equal to the inner diameter (e.g., diameter of ( φ 4.5 mm) of the tubular portion 21, ② a third portion 101B having a tapered surface with its outer diameter reduced contiguously from the tip portion of the first portion 101A to serve as a connecting portion and ③ a second portion 101C of columnar shape connected to the third portion 101B and serving as a tip portion of the stick member 101, whose outer diameter (e.g., diameter of φ 2.9 mm) is almost equal to the diameter of the exhaust hole 112 (e.g., diameter of φ 3.0 mm). A column 102 has a U-shaped vertical section as shown in FIG. 13A and the other end portion of the first portion 101A of the stick member 101 is welded to a rear surface of its top portion 102A. With this, the stick member 101 suspending downwardly is supported by the top portion 102A of the column 102. A base portion 103 with its upper end portion (or upper surface portion) connected to a lower portion of each side plate portion 102B (whose upper portion is bonded to a side portion of the top portion 102A) of the column 102 has, for example, a ring shape whose inner diameter is larger than the outer diameter of the press frit 31 (see FIG. 13B). A lower end portion (or lower surface portion) of the base portion 103 can come into contact with the major surface of the second substrate 111 outside the position where the press frit 31 is disposed. The length of the stick member 101 is determined larger than the total height of the column 102 and the base portion 103. The jig 10 is constituted of the stick member 101, the column 102 and the base portion 103.

The low melting point glass used as a base material for the sealing member is the press frit 31 which is obtained by press molding in such a tubular form as to be accommodated in a space surrounded by the base portion 103 and has an outer diameter larger than the outer diameter of one end portion of the hollow member (the outer rim 22A of the chip tube 2) and an innermost diameter larger than the outer diameter of the tubular portion 21 and smaller than the outer diameter of one end portion of the chip tube 2.

For obtaining the sealing member 3 used to bond the sealed container body 1 and the chip tube 2, as discussed above, the press frit 31 is disposed on the peripheral (outer peripheral) portion of the chip tube 2, the press frit 31 is heated and melted to make the low melting point glass flow, the sealed container body 1 and the chip tube 2 are bonded and thereafter the flowing frit glass is cooled.

If the positional relation between the exhaust hole 112 provided in the sealed container body 1 and the chip tube 2 is shifted due to vibration or the like when the press frit 31 is heated and melted, their respective center axes do not coincide with each other and the efflux vector of exhaust gas (e.g., air) from the sealed container body 1 inside the exhaust hole 112 and the chip tube 2 becomes non-uniform, and therefore an exhaust path of the exhaust gas inside the chip tube 2 is likely to have an ill effect of the obstacle (such as exhaust resistance of turbulence and the like inside the chip tube 2) to cause a bad exhaust condition, such as insufficient degree of vacuum, depending on the eduction. Sometimes, the melted low melting point glass enters the sealed container body 1 through the exhaust hole 112 to contaminate the inside of the sealed container body 1.

Therefore, when the bonding is made, it is necessary to insert the stick member 101 into the exhaust hole 112 provided in the sealed container body 1 and the hollow portion of the chip tube 2 so that the center axes of the exhaust hole 112 provided in the sealed container body 1 and the chip tube 2 may coincide with each other. Specifically, in this preferred embodiment, ① first, the press frit 31 which is press-molded in a tubular form in advance is inserted from the other end portion side of the tubular portion 21 of the chip tube 2 disposed on the major surface of the second substrate 111 on the periphery of the exhaust hole 112 and the inner surface of the press frit 31 is located on the surface of the flare-shaped opening portion 22. ② Next, the stick member 101 of the jig 10 is inserted in the hollow portion of the chip tube 2 from the side of the second portion 101C to fit the first portion 101A of the stick member 101 into the hollow portion of the chip tube 2. This allows the center axes of the chip tube 2 and the stick member 101 to coincide with each other. ③ Further, subsequently, the second portion 101C of the stick member 101 protruding from the flare-shaped opening portion 22 is inserted in the exhaust hole 112 and the lower surface portion of the base portion 103 of the jig 10 is disposed on the major surface of the second substrate 111. This allows the center axes of the stick member 101 and the exhaust hole 112 to stably coincide with each other and accordingly the center axes of the three portions 2, 101 and 112 stably coincide with one another.

The stick member 101 is not limited to the structure shown in FIG. 12, but other structure may be used only if it has such a shape (a sectional shape perpendicular to the direction of inserting) and a diameter as to be inserted in the hollow portion of the chip tube 2 and the exhaust hole 112.

In other words, the stick member 101 has at least the first and second portions 101A and 101C, and the maximum outer diameter of the first portion 101A is substantially equal to the inner diameter of the tubular portion 21 and the maximum outer diameter of the second portion 101C is substantially equal to the diameter of the exhaust hole 112. For example, when the shape changes, being stepped from the first portion 101A to the second portion 101C, the connecting portion 101B is not needed.

Further, though the tip portion 101C of the stick member 101 has a sectional shape perpendicular to the direction of inserting which is the same as that of the exhaust hole 112 in FIG. 12, the tip portion 101C may be provided with a taper in a portion to be inserted in the exhaust hole 112.

Furthermore, the sectional shape of the stick member 101 perpendicular to the direction of inserting may be changed.

As discussed above, by inserting the stick member 101 in the exhaust hole 112 and the hollow portion of the chip tube 2, it is possible to stably make the center axes of the chip tube 2 and the second substrate 111 substantially coincident with each other and prevent the chip tube 2 from falling down even if there occurs some vibration in the heating process.

As a matter of fact, the press frit 31 which is a tubular-shaped low melting point glass (thermofusible material) is attached on the chip tube 2 before the stick member 101 is inserted in the chip tube 2. Then, by inserting the stick member 101, the jig 10 is disposed on the second substrate 111, and by heating the whole device including the sealed container body 1 with the jig 10 disposed on the second substrate 111 in a furnace, the press frit 31 is heated and melted to bond the sealed container body 1 and the chip tube 2.

As shown in FIG. 12, since the jig 10 having the structure where the stick member 101 is connected to the column 102 and the column 102 is connected with the base portion 103 which is in contact with the second substrate 111 serves to determine the position where the chip tube 2 is disposed, when the jig 10 is made of metal material such as stainless (e.g., SUS304), the whole jig 10 becomes heavier than the chip tube 2 and the jig 10 is not vibrated even if the chip tube 2 is vibrated somewhat due to some reasons, to ensure its position and therefore the position of the chip tube 2 is stabilized.

Further, since jig 10 is made of metal material having a melting point and thermal conductivity higher than glass, the whole jig 10 is given a thermal energy from an external heating source to become a secondary heating source when the whole device is heated. Therefore, by inserting the stick member 101, the chip tube 2 is heated from the inside thereof and the low melting point glass obtained by melting the press frit 31 and the chip tube 2 are bonded well. Furthermore, since the base portion 103 is determined higher than the press frit 31, the press frit 31 is heated from the base portion 103 at the same time, and hence the press frit 31 is heated uniformly. Therefore, the low melting point glass obtained by melting the press frit 31 and the chip tube 2 are bonded much better Though the case where stainless is used as metal material for the jig 10, since the melting temperature of the low melting point glass is about 400° C., any metal material having a melting point higher than this temperature may be used as a material for the jig 10. From the viewpoint of the above-discussed secondary heating source, for example, the jig 10 may be made of copper.

Additional Remarks

Naturally, the jig 10 of this preferred embodiment can be applied to the cases of FIGS. 7 to 11.

Further, there may be a case where one end portion of the chip tube 2 is brought into contact with the major surface on the periphery of the exhaust hole 112 after the stick member 101 is inserted in the hollow portion of the chip tube 2 with the press frit and thereafter the second portion 101C is inserted into the exhaust hole 112.

Figure 20:
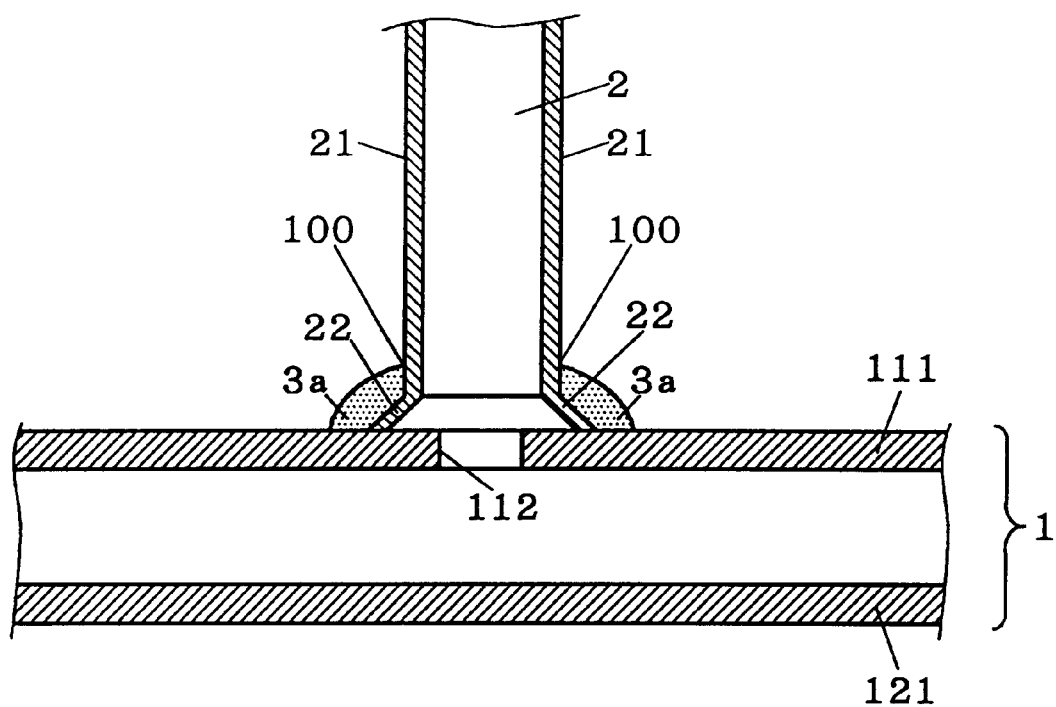
FIG. 20 is a cross section showing a problem of the first preferred embodiment.

The Fifth Preferred Embodiment (A) In the method of forming an outlet structure discussed in the first to fourth preferred embodiments, i.e., the method of heating and melting the press frit 31 disposed on the outer rim portion 22A of the flare-shaped opening portion 22 of the chip tube 2 to seal the sealed container body 1 and the chip tube 2, the sealed container body 1 may be vibrated by air pressure depending on the way of disposing the sealed container body 1 in the exhausting process and in this case, a stress is concentrated in the vicinity of a boundary 100 between the tubular portion 21 of the chip tube 2 and a fluid 3a of the low melting point glass obtained by melting the press frit 31 (see FIG. 20). As a result, a crack is produced in the tubular portion 21 of the chip tube 2 in the vicinity of the boundary 100 in the exhausting process, and there arises a problem of deterioration in strength characteristics of the chip tube 2.

(B) In the fourth preferred embodiment, though the jig of FIG. 12 is used to seal the sealed container body 1 and the chip tube 2, as the sealed container body 1 is cooled in the sealing process, the structure of the jig 10 shown in FIG. 12 may cause a problem that unnecessary impurity gases are inhaled in the sealed container body 1 from the other end portion of the tubular portion 21 of the chip tube 2 to degrade a display operation of the PDP.

In this preferred embodiment suggested is an outlet structure of sealed container to solve the above problems (A) and (B) while solving the problem of prior art. Specifically, the this preferred embodiment is characterized in that ① the sealing member 3 is disposed between the major surface of the second substrate 111 on the periphery of the outlet hole 112 provided in the sealed container body 1 and the outer rim portion 22A of the flare-shaped opening portion 22 of the chip tube 2 (one end portion of the chip tube 2), ② the chip tube 2 is disposed on the sealing member 3, and ③ then the sealing member 3 is heated, melted and cooled to form a frit glass layer in an intermediate portion between the one end portion of the chip tube 2 and the major surface, thereby sealing the sealed container body 1 and the chip tube 2.

Further, in this preferred embodiment, an improvement is made for the jig 10 of FIG. 12. Specifically, the jig 10 is provided with a cover to cut the other end portion of the chip tube 2 off from the outside air.

This preferred embodiment will be discussed in detail below with reference to figures.

Figure 14:
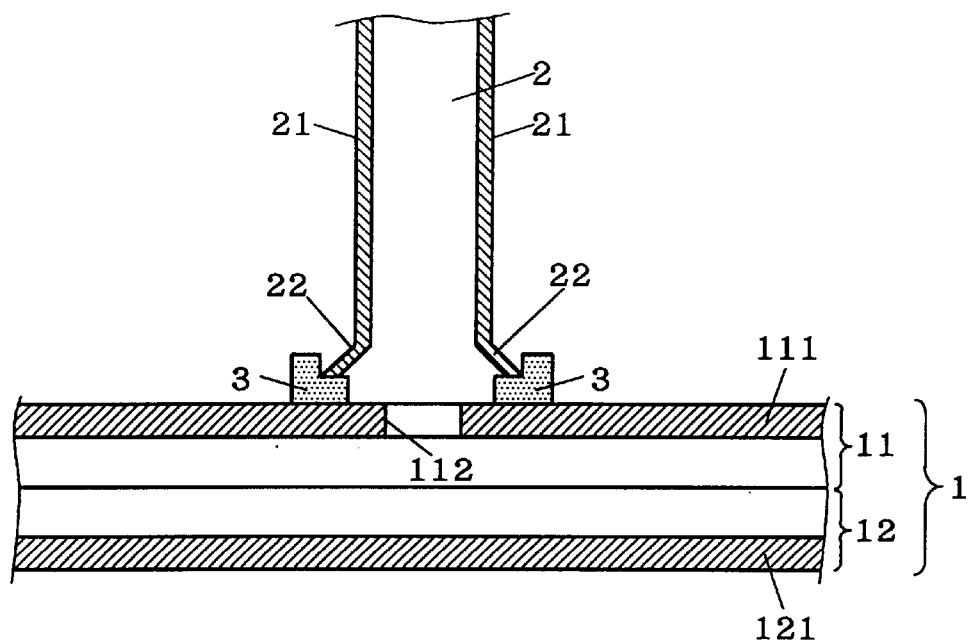
FIGS. 14 to 16 are cross sections each showing a method of forming an outlet structure of sealed container in accordance with a fifth preferred embodiment.

FIG. 14 is a vertical cross section showing an arrangement of elements in accordance with the fifth preferred embodiment. Reference signs identical to those of the first to fourth preferred embodiments represent the same elements. Specifically, reference numerals 1, 2 and 3 represent the sealed container body, the chip tube and the sealing member (hereinafter referred to as a press frit) obtained by press-molding the low melting point glass in a tubular form in advance to seal the sealed container body 1 and the chip tube 2, respectively. In this figure used is the press frit 3 having a concave portion or a stepped portion (structure to hole the outer rim of the opening portion 22) which is formed in an inner surface portion thereof and an outer diameter larger than the size of outer rim of the opening portion 22. Moreover, the innermost diameter (diameter of the innermost portion) of the press frit 3 is larger than the diameter of the exhaust hole 112 and smaller than the size of outer rim of the opening portion 22. Further, the press frit 3 may have a shape of simple tubular shape without the above concave portion.

Though the following discussion is made taking a PDP device to be used as the sealed container body 1 for example, the sealed container body 1 is not limited to this in terms of character also in this preferred embodiment.

The sealed container body 1 consists of a back panel 11 and a front panel 12 of the PDP and a not-shown sealing member to seal the back panel 11 and the front panel 12 to each other. Necessary parts of the PDP device are accommodated between an upper panel (the first substrate) 121 of container on the side of the front panel 12 and a lower panel (the second substrate) 111 of container on the side of the back panel 11 in the sealed container body 1. The exhaust hole 112 is provided from the major surface of the lower panel 111 of container to the inside thereof, and the chip tube 2 connecting the hole 112 and the outside is provided above the exhaust hole 112 and above the major surface on the periphery of the hole 112 by a forming method as discussed below. After exhausting the inside of the PDP through the chip tube 2, an opening (the other end portion) of the chip tube 2 is closed to cut the inside of the PDP off from the outside.

A method of forming the outlet structure of sealed container in this preferred embodiment will be discussed below. Specifically, (1) the thermofusible material (press frit) 3 formed by press molding in a tubular form, having an outer diameter larger than the outer diameter of the one end portion of the chip tube 2 and an innermost diameter larger than the diameter of the exhaust hole 112 and a melting point lower than the respective melting points of the chip tube 2, the sealed container body 1 and the jig 10 discussed later is disposed on the major surface of the lower panel 111 on the periphery of the exhaust hole 112, (2) the one end portion of the chip tube 2 is disposed on a surface (a bottom surface of the concave portion) of the press frit 3 so that the center axes of the chip tube 2 and the exhaust hole 112 may substantially coincide with each other, and (3) then the press frit 3 is heated and melted to bond the sealed container body 1 and the one end portion of the chip tube 2 to each other.

Further, the shape of the press frit 3 can be optionally chosen by changing a mold in molding the press frit. For example, by this choice, the height of the press frit 3 may be changed and the inner diameter of the press fit 3 may be determined much larger than the diameter of the exhaust hole 112. Thus, since the melting condition of the press frit 3 can be determined finely through choosing the shape of the press frit 3, it is possible to produce an effect of improving uniformity in sealing.

Figure 15:
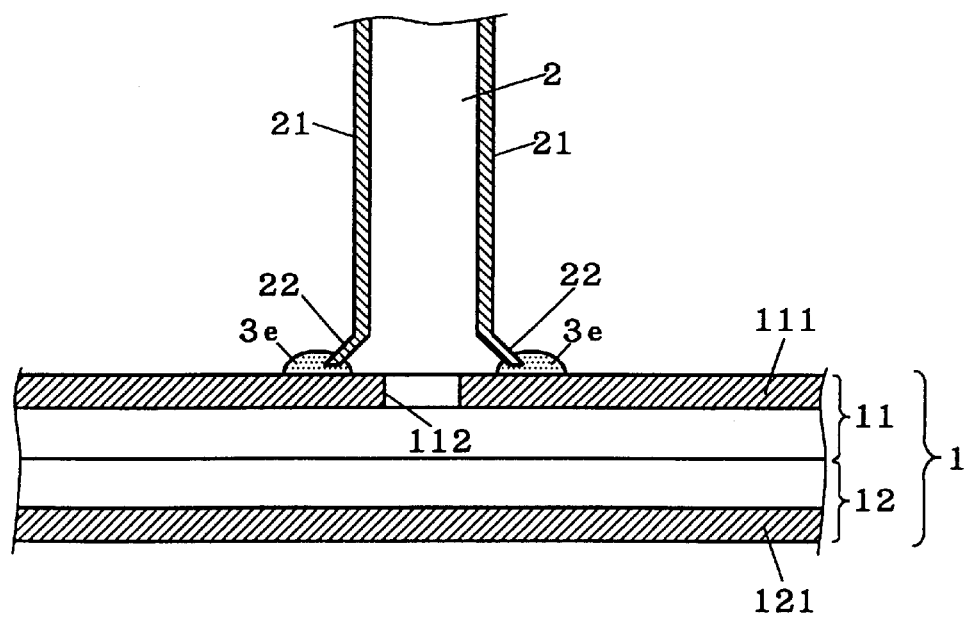

The sectional shape of the sealing member 3e obtained by cooling the flowing low melting point glass (frit glass) after melting the press frit 3 is shown in FIG. 15. Specifically, the outlet structure of sealed container shown in FIG. 15 comprises (a) the hollow member 2 having the tubular portion 21 and the flare-shaped opening portion 22 contiguous to the tubular portion 21 with its diameter expanded towards one end portion of the hollow member 2, in which the one end portion is provided above the major surface of the sealed container body 1 on the periphery of the exhaust hole 112 provided in the sealed container body 1 so that the opening portion 22 and the tubular portion 21 can cover the exhaust hole 112 and the exhaust hole 112 and the tubular portion 21 have center axes which substantially coincide with each other, and (b) the sealing member 3e adhered to the one end portion of the hollow member 2 to fill between the one end portion and the major surface.

With this, (1) the sealed container body 1 and the chip tube 2 can be sealed reliably with the sealing member 3e without applying the low melting point glass paste on the front and rear surfaces of the outer rim portion of the chip tube 2 by hand and (2) it is possible to prevent the above problem (A) since the sealing member 3e does not extend to the surface of the tubular portion 21 beyond the boundary 2A (see FIG. 1).

Next, discussion will be made on a practical method of efficiently heating, melting and cooling the press frit 3 which has the chip tube 2 disposed on the surface of the press frit 3 with the center axes of the chip tube 2 (or the tubular portion 21) and the exhaust hole 112 being coincident, while keeping the coincidence of the center axes. The method is achieved by using the jig 10 shown in a vertical cross section of FIG. 16.

Figure 16:
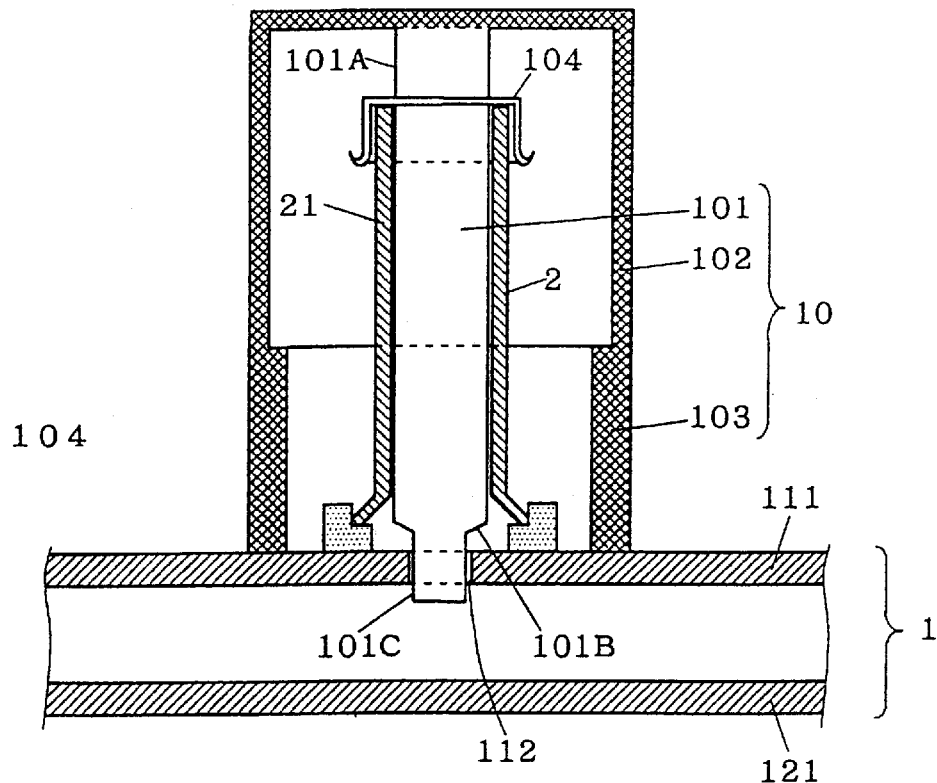

In FIG. 16, the jig 10 has the same structure as that of FIG. 12, consisting of a shaft portion or stick portion 101 (the first portion 101A, the connecting portion 101B and the second portion 101C), the column 102 (see FIGS. 13A and 13B), the ring portion (base portion) 103 and a cover 104. The jig 10 of FIG. 16 is structurally different from that of FIG. 12 in that it has the cover 104. The cover 104 has an inner diameter substantially equal to the (maximum) outer diameter of the first portion 101A and protrudes outside from the surface of the tubular portion 21, like a cover at the tip portion of a glass container.

The use of the jig 10 will be discussed below. Specifically, the tubular-shaped press frit 3 is disposed on the major surface of the second substrate 111 of the sealed container body 1 so as to surround the exhaust hole 112 away therefrom by a predetermined distance, and the chip tube 2 is disposed on the bottom surface of the concave portion of the press frit 3. With this, the chip tube 2 is supported by the concave portion and stands above the major surface. While the chip tube 2 stands, the cover 104 is put on the other end portion of the chip tube 2 so as to cover the other end portion.

The second portion 101C of the shaft portion 101 of the jig 10 is inserted in the exhaust hole 112 of the sealed container body 1 through a center hole of the cover 104 and the a center portion or the hollow portion of the chip tube 2. At this time, the first portion 101A is inserted in the hollow portion of the chip tube 2, to make all the center axes of the elements 2, 3, 101, 104 and 112 coincident. Then, the jig 10 stands on the major surface outside the press frit 3 of the sealed container body 1 while being supported by the ring portion 103. The whole device including the jig 10 in this state is heated and the press frit 3 is melted, and thereafter the flowing frit glass obtained by melting is cooled to be solidified.

When the jig 10 is used to seal the sealed container body 1 and the chip tube 2, the positioning can be stably made and the press frit 3 is heated uniformly with the secondary heating by the ring portion 103. Moreover, providing the cover 104 on the other end portion of the chip tube 2 which is opened remarkably suppress inhalation of unnecessary impurity gases in the sealing process, especially during cooling, and the grade of display operation can be stabilized.

In this preferred embodiment, by appropriately choosing the flowing characteristics of the frit glass used as the press frit 3, more specifically, by using a base material having a dull flowing characteristics for the press frit 3, the melted frit glass is prevented from flowing in the exhaust hole 112.

Thus, in this preferred embodiment, since the sealing member 3e exists only in the intermediate portion between the inner and outer peripheral portions and the outer rim portion (the one end portion) of the flare-shaped opening portion 22 of the chip tube 2 and the major surface of the second substrate 111, no stress concentrates on the tubular portion 21 of the chip tube 2 and no crack is produced on the tubular portion in the vicinity of the boundary between the tubular portion 21 of the chip tube 2 and the flowing press frit in the exhausting process, and therefore a stable sealing condition can be maintained.

Naturally, a frit glass having any shape can be used since the press frit 3 is formed by press molding as the frit glass, and that allows easy control over the amount of frit glass and handling and maintenance.

Further, it is natural that the cover 104 of FIG. 16 is applicable to the jig 10 of FIG. 12.

The Sixth Preferred Embodiment

Figure 17:
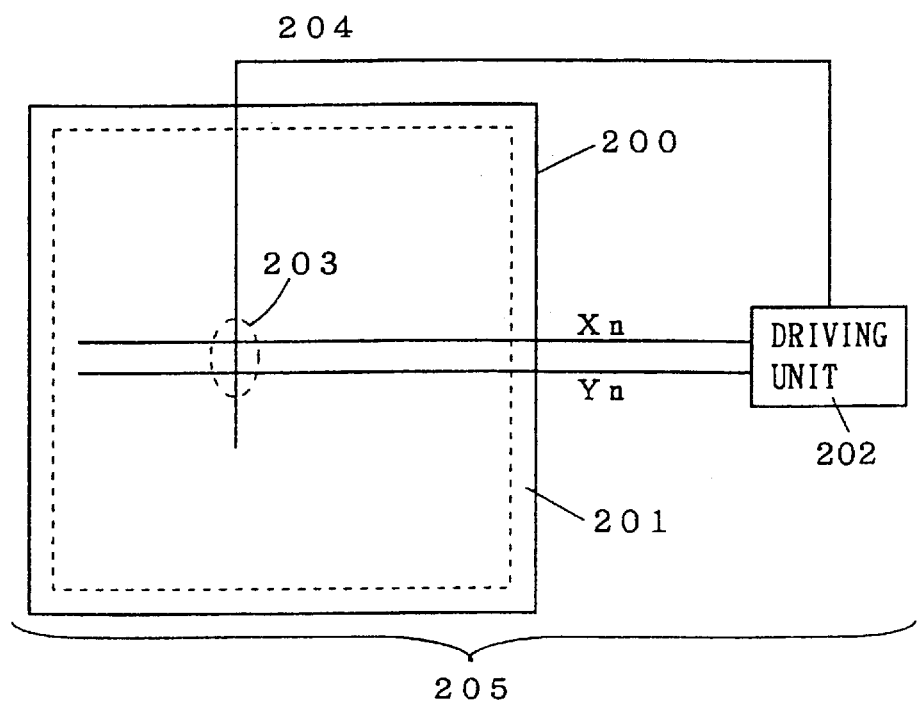
FIG. 17 is a block diagram showing an exemplary display device in accordance with a sixth preferred embodiment.
Figure 18:
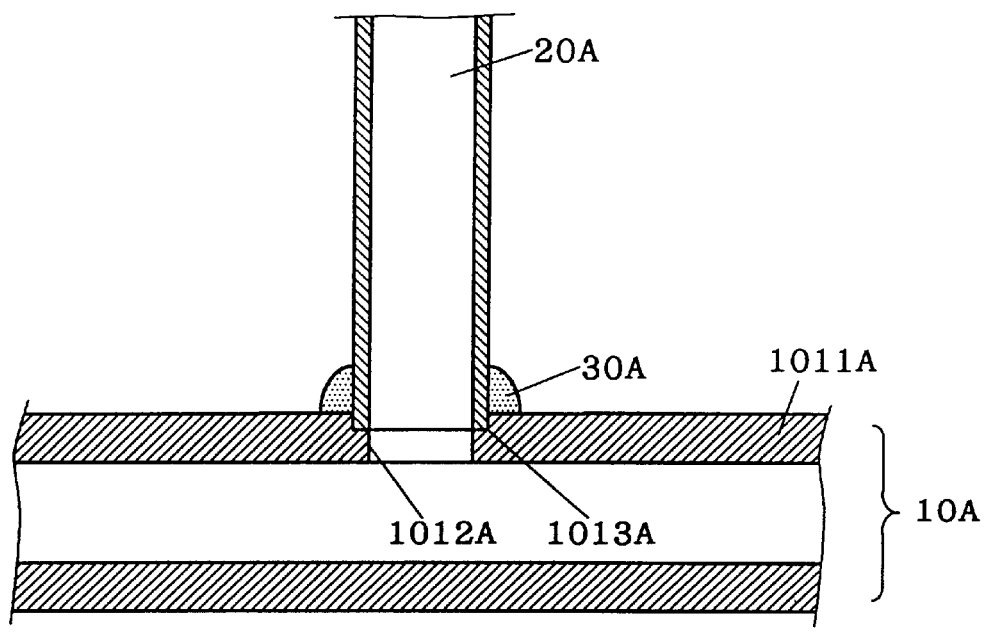
FIGS. 18 and 19 are cross sections each showing a principal part of an outlet structure of sealed container in the prior art.
Figure 19:
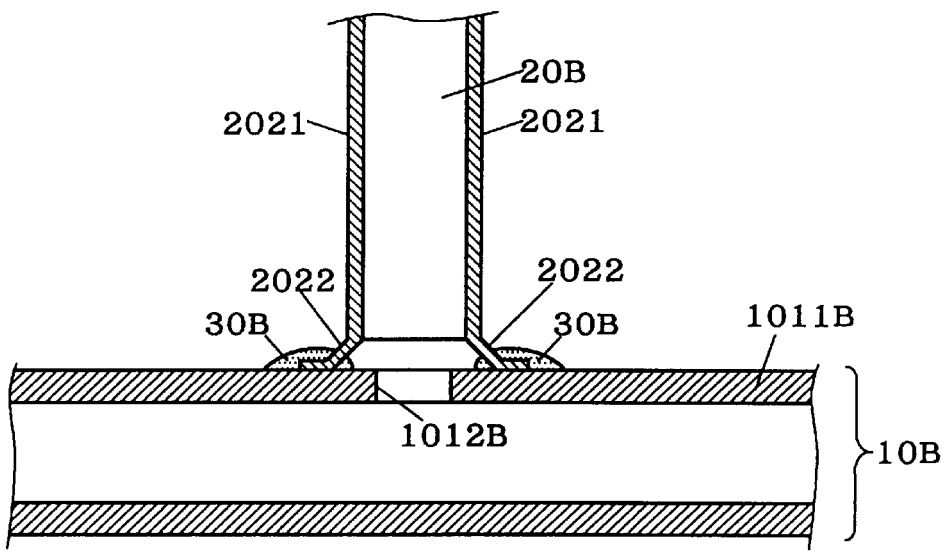

FIG. 17 is a block diagram showing an exemplary display device in accordance with the sixth preferred embodiment of the present invention, and a PDP corresponds to the sealed container body, having an outlet structure as discussed in the first to fifth preferred embodiments. Hereinafter, an AC-type plasma display device will be discussed as the display device. It is natural that the first to fifth preferred embodiments are applicable to a DC-type plasma display panel.

FIG. 17 shows a display device (AC-type plasma display device) 205, a PDP 200 used as a display device body, a display portion 201 for making a display in the PDP 200, address electrodes 204, X-electrodes Xn and Y electrodes Yn.

The display device 205 consists of the PDP 200 which comprises the address electrodes 204, the X electrodes Xn and the Y electrodes Yn as electrodes and has the display portion 201 for displaying an image based on a discharge operation by discharge cells 203 and a driving unit 202 which is connected to the address electrodes 204, the X electrodes Xn and the Y electrodes Yn and supplies a voltage for driving.

To obtain a desired image in the AC-type plasma display device, as an addressing operation, a write voltage is applied across the address electrode 204 and, for example, the Y electrode Yn to make a write discharge, thereby determining the discharge cell 203 concerning the display (this is a write operation to store wall charges into a dielectric in the plasma display, which is performed in the generally-known AC-type plasma display device). After that, as a sustain operation (display operation), a sustain voltage pulse is alternately applied to one of the X electrode Xn and Y electrode Yn in order for the discharge cell 203 determined in the addressing operation to make a discharge for display.

With this sustain operation, a discharge occurs between the X electrode Xn and the Y electrode Yn of the discharge cell 203 to display an image on the display portion 201. After a predetermined sustain operation is completed, an erase voltage for an erase operation (operation for erasing the above wall charges) is applied across the X electrode Xn and the Y electrode Yn, in order to change the displayed image on the display portion 201.

The driving unit 202 performs a driving control over a selection on voltage values for the write voltage, the sustain voltage and the erase voltage to be applied to each of the X electrode Xn and the Y electrode Yn and the electrode to which the voltage is applied and a timing for applying.

When the PDP 200 having aforementioned the outlet structure is used, the display device 205 with excellent display condition is achieved without contamination by the melted low melting point glass inside the PDP 200. Further, even if some external force is applied due to vibration of conveyance and the like, no damage is caused in the outlet structure of the PDP 200 since the bonding portion has a high bending strength.

Though the above discussion has been made on the PDP, it is natural that this preferred embodiment is applicable to a vacuum fluorescent display and the like, and this preferred embodiment is not necessarily limited to the PDP.

Further, the above-discussed exhaust hole 112, the chip tube 2 and the press frit 31 may have shapes based on circle, i.e., an exhaust hole having a circular opening, a funnel-shaped chip tube and a tubular-shaped press frit, or shapes based on rectangle, i.e., an exhaust hole having a rectangular opening, a funnel-shaped chip tube having a rectangular opening and a rectangularly-tubular press frit, or may have a combination of these shapes. In these cases, naturally, the same effect as discussed above can be produced.

Though the case where the exhaust hole 112 is provided in the second substrate 111 of the sealed container 1 and the chip tube 2 to be connected to the exhaust hole 112 is bonded to the second substrate 111 has been discussed, there may be a case where an exhaust hole like the exhaust hole 112 provided in the second substrate 111 is provided in the first substrate 121 of the sealed container 1 and the chip tube 2 to be connected to the exhaust hole is bonded to the first substrate 121. In this case, naturally, the same effect as discussed above can be produced.

While the invention has been shown and described in detail, the foregoing description is in all aspects illustrative and not restrictive. It is therefore understood that numerous modifications and variations can be devised without departing from the scope of the invention.

I claim:

1. A method of forming an outlet structure of a sealed container, comprising the steps of:
   (a) obtaining a sealed container body comprising a hole for exhaust formed inwardly from a major surface of said sealed container body;
   (b) obtaining a hollow member having a tubular portion and a flare-shaped opening portion contiguous to said tubular portion with its diameter expanded towards one end portion of said hollow member;
   (c) obtaining a thermofusible material which is produced in a tubular form, having an outer diameter larger than an outer diameter of said one end portion of said hollow member, an innermost diameter smaller than said outer diameter of said one end portion and larger than a diameter of said hole and a melting point lower than those of said hollow member and said sealed container body;
   (d) disposing said thermofusible material on said major surface on the periphery of said hole and disposing said one end portion on a surface of said thermofusible material so that the center axes of said hollow member and said hole substantially coincide with each other; and
   (e) bonding said sealed container body and said one end portion of said hollow member to each other by heating and melting said thermofusible material, wherein
   said step (d) comprises the steps of:
   (d-i) obtaining a jig comprising (1) a stick member comprising a first portion with its maximum diameter being substantially equal to an inner diameter of said tubular portion and a second portion contiguous to one end of said first portion to serve as a tip portion with its maximum diameter being substantially equal to a diameter of said hole, (2) a column having a top portion connected to the other end of said first portion of said stick member and a side plate portion with its upper portion connected to said top portion, said column supporting said stick member extending downwardly with said top portion, and (3) a base portion having an upper surface portion connected to a lower portion of said side plate portion of said column and a lower surface portion which can come into contact with said major surface outside a position where said thermofusible material is disposed, said jig made of a material having a melting point higher than said thermofusible material, a length of said stick member being larger than a height from said top portion to said lower surface portion of said base portion;
   (d-ii) disposing said thermofusible material on said major surface on the periphery of said hole and thereafter disposing said one end portion of said hollow member on said surface of said thermofusible material; and
   (d-iii) inserting said stick member into a hollow portion of said hollow member to fit said first portion into said hollow portion and further inserting said second portion into said hole to provide said lower surface portion of said base portion on said major surface in contact with each other, and said step (e) comprising the step of
   (e-i) heating said thermofusible material together with said jig.

2. The method of claim 1, wherein
said step (d-i) comprises the step of
   (d-i-1) obtaining a cover having an inner diameter which is substantially equal to said maximum outer diameter of said first portion and an outer diameter larger than an outer diameter of said tubular portion,
said step (d-ii) comprises the step of
   (d-ii-1) putting said cover on the other end portion of said hollow member disposed on said surface of said thermofusible material, and said step (d-iii) comprises the step of
  (d-iii-1) inserting said stick member into said hollow portion of said hollow member through a center hole of said cover.

3. The method according to claim 1, wherein said jig is formed in one piece.

4. A method of forming an outlet structure of sealed container, comprising the steps of:
  (a) obtaining a sealed container body comprising a hole for exhaust formed inwardly from a major surface of said sealed container body;
  (b) obtaining a hollow member having a tubular portion and a flare-shaped opening portion contiguous to said tubular portion with its diameter expanded towards one end portion of said hollow member;
  (c) obtaining a thermofusible material which is produced in a tubular form, having an outer diameter larger than an outer diameter of said one end portion of said hollow member, an innermost diameter smaller than an inner diameter of said one end portion and larger than a diameter of said hole and a melting point lower than those of said hollow member and said sealed container body;
  (d) using a jig to locate said thermofusible material on said major surface on the periphery of said hole and disposing said one end portion on a surface of said thermofusible material so that the center axes of said hollow member and said hole substantially coincide with each other, said jig also fixing the relationship between said thermofusible material and said one end portion, wherein said jig comprises:
    an inserting rod having a first end portion and a second end portion, said first end portion having a diameter being substantially equal to said diameter of said hole, said second end portion having a diameter being smaller than a diameter of said tubular portion of said hollow member;
    a ring shaped base portion encompassing said outer diameter of said thermofusible material;
    at least one vertical supporting column having a first end and a second end, wherein said first end is operatively connected to an upper surface portion of said ring shaped base portion; and
    a horizontal supporting column being operatively connected to said second end of said at least one vertical supporting column and to said second end portion of said inserting rod; and
  (e) bonding said sealed container body and said one end portion of said hollow member to each other by heating and melting said thermofusible material, wherein during the bonding process, a lower surface portion of said ring shaped base portion contacts said major surface of said sealed container body, said inserting rod is positioned within said hollow member, said thermofusible material is disposed between said inserting rod and said ring shaped base portion, and said first end portion of said inserting rod is inserted in said hole of said sealed container body.

5. The method of claim 4, wherein said step e) of bonding is performed while said jig fixes the relationship between said thermofusible material and said one end portion.

6. A method of forming an outlet structure of sealed container comprises the steps of:
  (a) obtaining a hollow member including a tubular portion and a flare-shaped opening portion contiguous to said tubular portion said hole through said tubular portion and said flare-shaped opening portion after disposing said thermofusible material on the periphery of said hollow member to fit said first portion into said tubular portion and make the center axes of said hole and said hollow member coincident; and
  (e) bonding said sealed container body and said hollow member to each other by heating said thermofusible material together with said jig to melt said thermofusible material.

7. The method according to claim 6, wherein said jig is formed in one piece.

* * * * *